(12) United States Patent
Kadowaki et al.

(10) Patent No.: US 10,054,187 B2
(45) Date of Patent: Aug. 21, 2018

(54) LIQUID-CHARGED ANTIVIBRATION DEVICE

(71) Applicant: YAMASHITA RUBBER CO., LTD., Fujimino, Saitama (JP)

(72) Inventors: Hirokazu Kadowaki, Fujimino (JP); Koichi Matsumoto, Fujimino (JP)

(73) Assignee: YAMASHITA RUBBER CO., LTD., Fujimino-shi, Saitama (JP)

( * ) Notice: Subject to any disclaimer, the term of this patent is extended or adjusted under 35 U.S.C. 154(b) by 11 days.

(21) Appl. No.: 15/279,106

(22) Filed: Sep. 28, 2016

(65) Prior Publication Data

US 2017/0089420 A1    Mar. 30, 2017

(30) Foreign Application Priority Data

Sep. 29, 2015 (JP) ................. 2015-191502

(51) Int. Cl.
*F16F 13/10* (2006.01)
*B60K 5/12* (2006.01)

(52) U.S. Cl.
CPC .......... *F16F 13/105* (2013.01); *B60K 5/1208* (2013.01); *F16F 13/10* (2013.01)

(58) Field of Classification Search
CPC .. F16F 13/08; F16F 13/20; F16F 13/10; F16F 13/105; F16F 13/106; F16F 13/107; B60K 5/1208

USPC ............ 267/140.13, 140.11, 140.12, 104.14
See application file for complete search history.

(56) References Cited

U.S. PATENT DOCUMENTS

| | | | |
|---|---|---|---|
| 2002/0005607 A1* | 1/2002 | Muramatsu | F16F 13/106 267/140.11 |
| 2003/0178755 A1* | 9/2003 | Rudolf | F16F 13/101 267/140.13 |
| 2013/0043626 A1* | 2/2013 | Satori | F16F 13/105 267/140.13 |
| 2015/0123326 A1* | 5/2015 | Kadowaki | F16F 13/106 267/140.13 |

FOREIGN PATENT DOCUMENTS

JP    2012-13153 A    1/2012

* cited by examiner

*Primary Examiner* — Robert A. Siconolfi
*Assistant Examiner* — San M Aung
(74) *Attorney, Agent, or Firm* — Merchant & Gould P.C.

(57) ABSTRACT

An object of the present invention is to provide a liquid-charged antivibration device for reducing amplitude dependency. Provided is a liquid-charged antivibration device including: a liquid chamber in which operating liquid is charged; and a partitioning member which partitions the liquid chamber into a main liquid chamber and a sub liquid chamber.

2 Claims, 8 Drawing Sheets

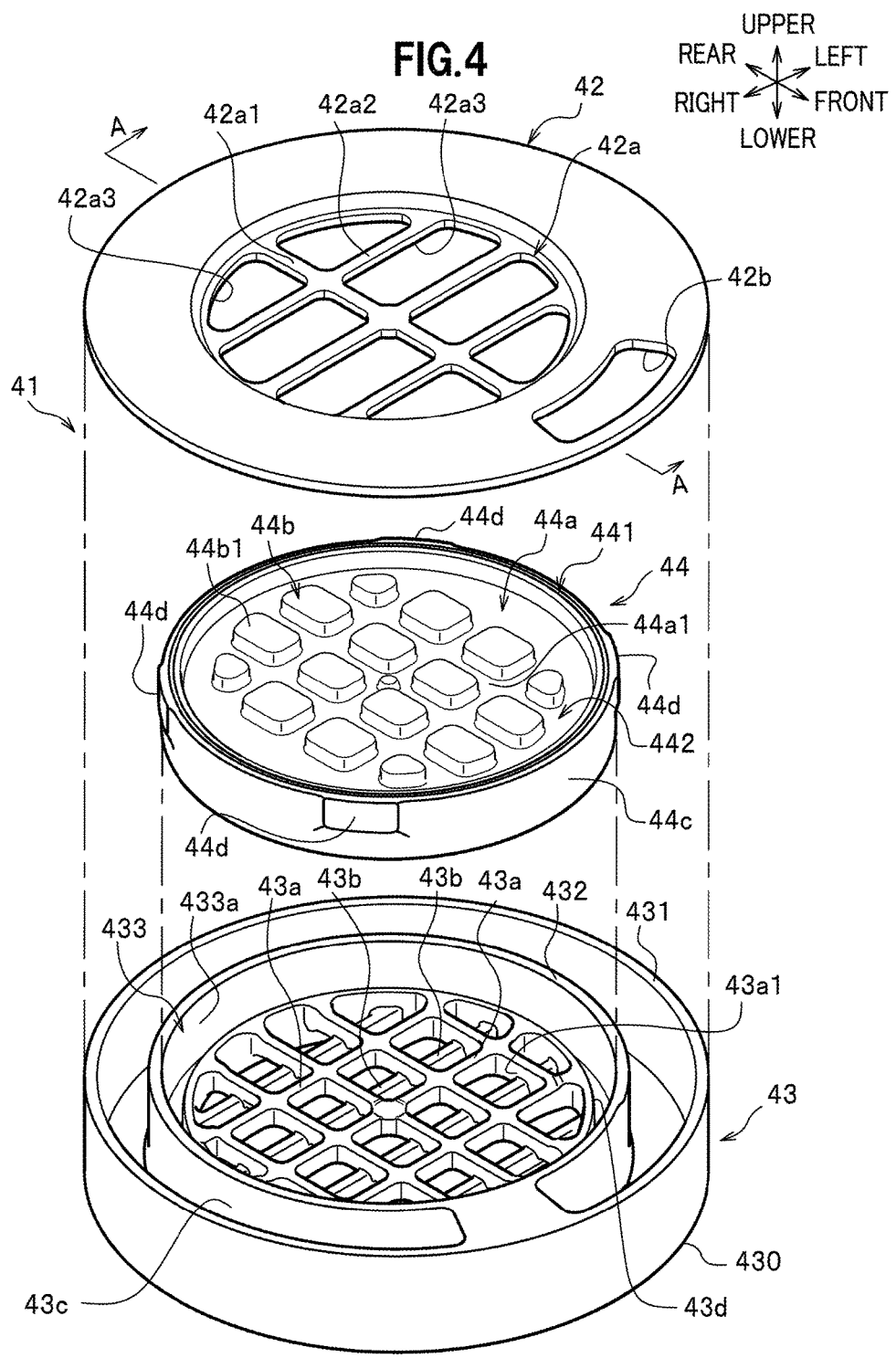

LIQUID-CHARGED ANTIVIBRATION DEVICE

CROSS REFERENCE TO RELATED APPLICATION

This application claims the benefit of priority to Japanese Patent Application No. 2015-191502, filed on Sep. 29, 2015, the disclosure of which is hereby incorporated herewith by reference.

BACKGROUND OF THE INVENTION

Field of the Invention

The present invention relates to a liquid-charged antivibration device used for an engine mount of a vehicle and the like.

Description of the Related Arts

Conventionally, as this kind of the liquid-charged antivibration device, a device disclosed in Patent Literature 1 (JP 2012-13153 A) is known. This liquid-charged antivibration device includes a first fitting member fitted to an engine, a second fitting member fitted to a vehicle body, and an insulator for connecting the first fitting member and the second fitting member. In this liquid-charged antivibration device, an operating liquid is housed inside the insulator, and the inside of the insulator is partitioned in a main liquid chamber and a sub liquid chamber by a partitioning member.

The partitioning member sandwiches and holds an elastic movable membrane at the central portion thereof by an upper plate and a lower holder, which are separated in upper and lower, and is provided with an orifice passage on the outside in the radial direction of the elastic movable membrane. The elastic movable membrane communicates with the main liquid chamber and the sub liquid chamber through the central upper opening of the upper plate and the central lower opening of the lower holder. The elastic movable membrane is elastically deformed by variation of the liquid pressure in the main liquid chamber, and thereby absorbs the variation in the internal pressure.

The dynamic characteristics of this liquid-charged antivibration device change depending on the shape and the dimensions (cross-sectional area and the length) of the orifice passage at the time when the operating liquid flows, and the characteristics (density and viscosity) of the operating liquid. In addition, it is known that the above dynamic characteristics depend on an input amplitude condition (i.e., have amplitude dependency).

In general, in a liquid-charged antivibration device, if the input amplitude at the time of idling or the like is relatively small, low dynamic spring characteristic is required. On the other hand, if the input amplitude at the time of engine shake or the like is relatively large, high damping characteristic is required.

SUMMARY OF THE INVENTION

However, for example, if the characteristics of an orifice passage are set at the time of engine shake and the like, unnecessarily significant damping characteristic is extended at the time of idling or the like. In contrast, if the characteristics of the orifice passage are set at the time of idling or the like, the damping characteristic is degraded at the time of engine shake or the like, and desired antivibration performance can be hardly extended. For this reason, it has been desired to reduce variation in frequency characteristic associated with a variation in amplitude, and thereby reduce amplitude dependency.

The present invention is made to solve the above problem, and an object of the present invention is to provide a liquid-charged antivibration device for reducing amplitude dependency.

In order to achieve the above object, a liquid-charged antivibration device according to the present invention includes: a liquid chamber in which operating liquid is charged; and a partitioning member which partitions the liquid chamber into a main liquid chamber and a sub liquid chamber. The partitioning member includes: a first plate disposed on the main liquid chamber side; a second plate disposed on the sub liquid chamber side; and an elastic partitioning member sandwiched between the first plate and the second plate. The elastic partitioning member includes: a thin membrane portion; and a thick membrane portion whose thickness in a direction of a vibration input axis is thicker than that of the thin membrane portion. The second plate includes a restricting portion which restricts elastic deformation of the elastic partitioning member. The restricting portion includes: a first restricting portion which is disposed so as to face the thick membrane portion and restricts elastic deformation amount of the thick membrane portion; and a second restricting portion which is disposed so as to face the thin membrane portion and restricts elastic deformation amount of the thin membrane portion.

In this liquid-charged antivibration device, if an input amplitude is relatively small, variation in liquid pressure is absorbed by the thin membrane portion of the elastic partitioning member (i.e., low dynamic spring characteristic is obtained). On the other hand, if the input amplitude is relatively large, the displacement amount of the thick membrane portion of the elastic partitioning member is restricted by the first restricting portion, while the displacement amount of the thin membrane portion is restricted by the second restricting portion, and thus the stiffness of the elastic partitioning member is effectively improved. Thus, change in the frequency characteristic associated with change in the amplitude is reduced, and reduction of amplitude dependency can be achieved.

Further, the clearance between the thick membrane portion and the first restricting portion is preferably smaller than that between the thin membrane portion and the second restricting portion. When the above condition is met, if the input amplitude is relatively large, the displacement amount of the thick membrane portion is restricted by the first restricting portion, and the displacement amount of the thin membrane portion is subsequently restricted by the second restricting portion. For this reason, the pressure in the main liquid chamber quickly rises to achieve high damping characteristics, and the variation in the frequency characteristic associated with the variation in the amplitude is suitably reduced.

Still further, as the elastic deformation of the elastic partitioning member is gradually restricted by the difference between the clearances, generation of strike sounds (contact sound between the elastic partitioning member and the restricting portions) can be reduced, compared with a case where the elastic deformation of the elastic partitioning member is restricted at a time.

Still further, the first restricting portion and the second restricting portion are preferably disposed so as to be at least partially perpendicular to each other. When the above condition is met, the displace amount of the elastic partitioning member can be made uniform, and the amplitude dependency can be reduced more effectively.

BRIEF DESCRIPTION OF THE DRAWINGS

FIG. 4 is an exploded perspective view of the partitioning member;

PREFERRED EMBODIMENT OF THE INVENTION

Figure 1:
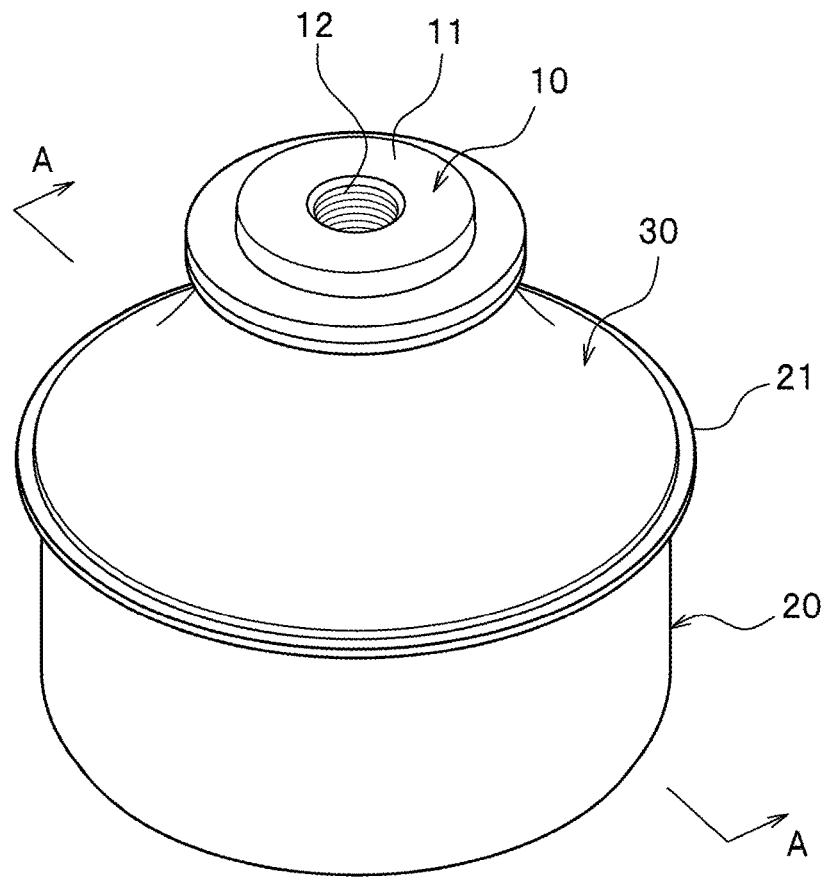
FIG. 1 is a perspective view showing a liquid-charged antivibration device of one embodiment according to the present invention.

An embodiment of a liquid-charged antivibration device according to the present invention will be described below, referring to the drawings. In addition, in the following description, the means of wordings "front-rear" and "upper-lower" are based on the direction shown in FIG. 1. However, the wordings "front-rear" and "upper-lower" do not always agree with the front-rear direction and the upper-lower direction of the vehicle body of a vehicle. In addition, the upper-lower direction for the liquid-charged antivibration device is the input direction of primary vibration.

Figure 2:
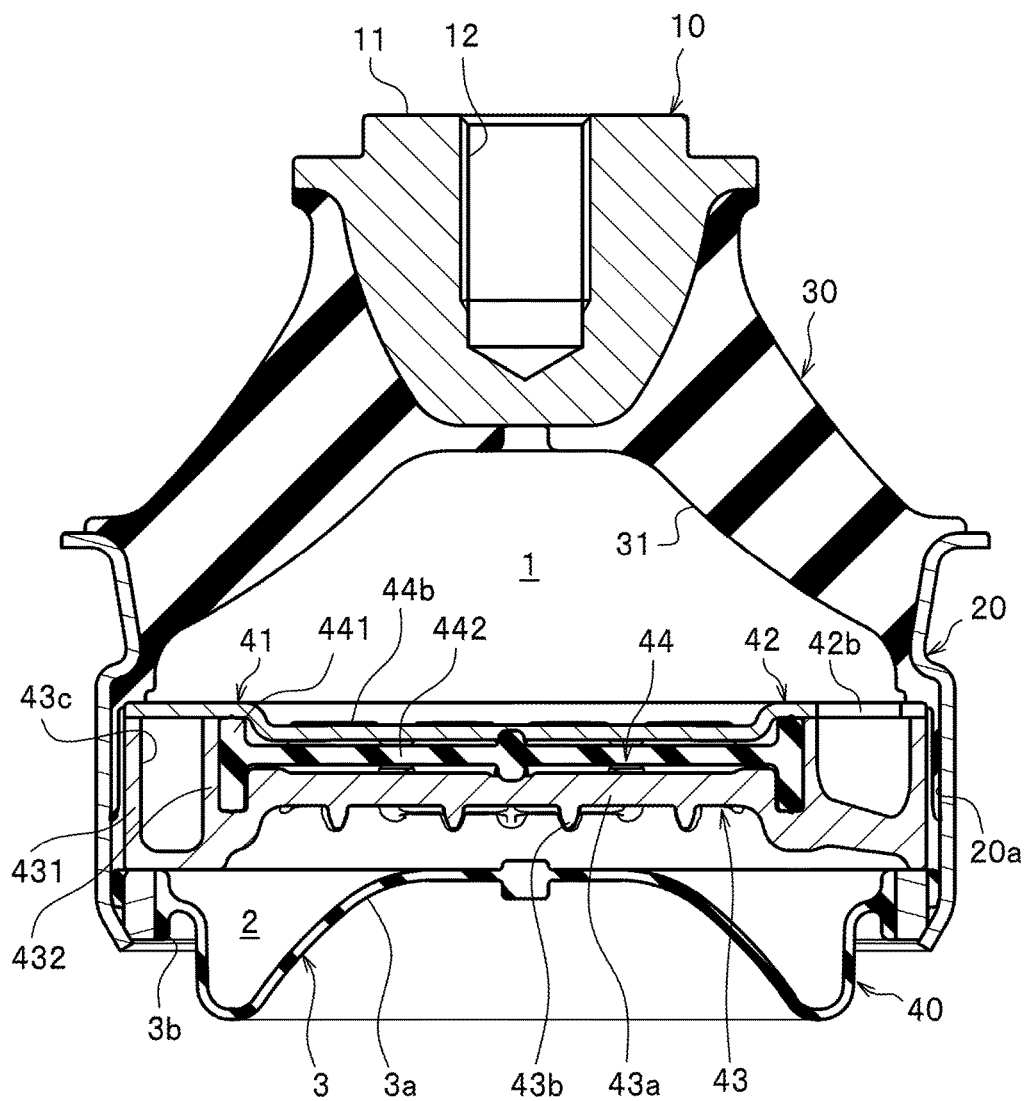
FIG. 2 is a cross-sectional view taken along the line A-A in FIG. 1.
Figure 3A:
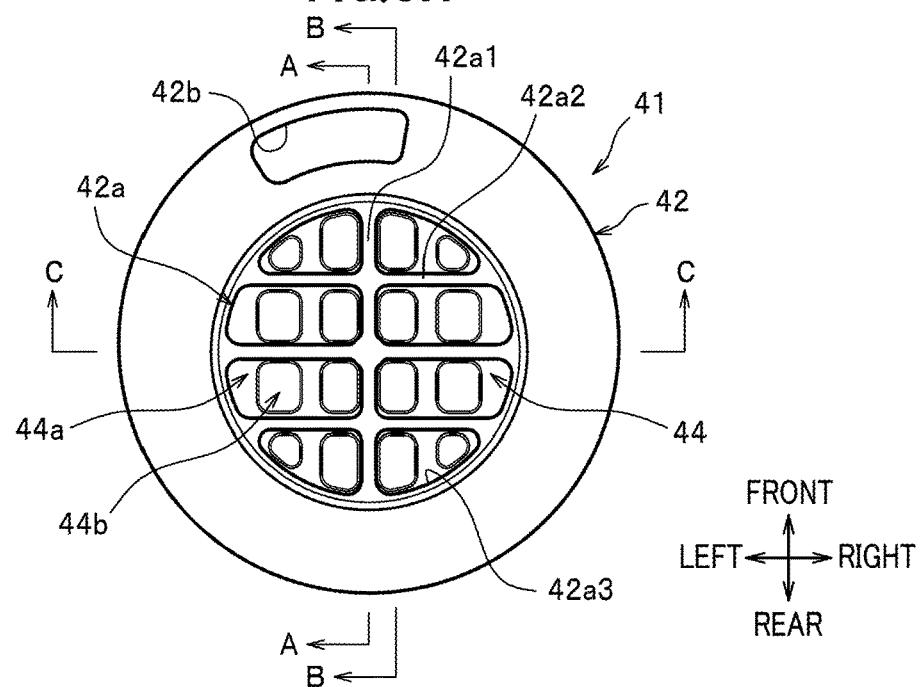
FIG. 3A is a top view of a partitioning member.
Figure 3B:
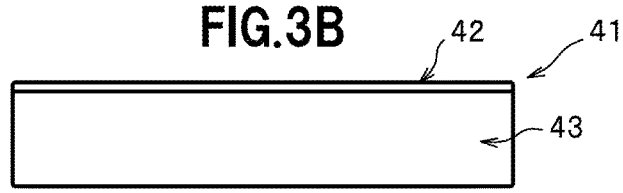
FIG. 3B is a side view of the partitioning member.

The liquid-charged antivibration device is an antivibration device of a liquid charging type disposed between a vibration-source side and a non-vibration-source side (vibration receiving side). As shown in FIG. 1, the liquid-charged antivibration device is provided with a first fitting member 10, a second fitting member 20, and an insulator 30 for elastically connecting the first fitting member 10 and the second fitting member 20. The first fitting member 10 is, for example, disposed on an engine (not shown) side, which is a vibration source side. The second fitting member 20 is disposed on a vehicle body (not shown) side, which is the receiving vibration side. In addition, the first fitting member 10 may be disposed on the vehicle body side, and the second fitting member 20 may be disposed on the engine side. As shown in FIG. 2, an antivibration unit 40 is fitted to the second fitting member 20. As shown in FIG. 3, the antivibration unit 40 has a circular shape in a plan view. In addition, the line A-A shown in FIG. 3A corresponds to the line A-A shown in FIG. 1.

The first fitting member 10 is a member fixed to the engine side (the vibration source side). As shown in FIGS. 1 and 2, the first fitting member 10 is provided integrally with the top portion of the insulator 30. As shown in FIG. 2, the substantially entire first fitting member 10 is embedded in the insulator 30, and is also bonded to the insulator 30 by vulcanization. The first fitting member 10 is, for example, made from aluminum alloy The first fitting member 10 has a tapered cross-sectional shape. The first fitting member 10 is provided with a flat bearing face 11 and a bolt hole 12, which are exposed from the insulator 30. Primary vibration is input in the normal direction of the bearing face 11.

As shown in FIG. 2, the insulator 30 is provided with a recessed portion 31. The recessed portion 31 opens downward in the figure, and partitioned by a partitioning member 41 of the antivibration unit 40 to form a main liquid chamber 1. A non-compressive operating liquid is charged into the recessed portion 31. The lower portion of the insulator 30 is fixed to the inner surface of the second fitting member 20.

The main liquid chamber 1 and a sub liquid chamber 2 are partitioned by the partitioning member 41 of the antivibration unit 40. The main liquid chamber 1 communicates with the sub liquid chamber 2 through an orifice passage 43c formed on the outer circumferential portion of the partitioning member 41. The orifice passage 43c is set, for example, so as to resonate with low frequency vibration. The sub liquid chamber 2 is formed between a diaphragm 3 and the partitioning member 41, and the diaphragm 3 is a part of the wall portion. Vibration traveling downward in FIG. 2 is on the positive pressure side which pressurizes the main liquid chamber 1, and vibration traveling upward is on the negative pressure side which depressurizes the main liquid chamber 1. The main liquid chamber 1 repeats expanding and shrinking by alternate input of the vibrations on the positive pressure side and the negative pressure side. Herein, the operating liquid moves between the main liquid chamber 1 and the sub liquid chamber 2 through the orifice passage 43c, and achieves a liquid column resonance at a certain resonance frequency to realize high damping.

The second fitting member 20 is a member fixed to the vehicle body side (vibration receiving side) through a bracket (not shown). The second fitting member 20 has a hollowed cylindrical shape. The second fitting member 20 is fixed to a fitting portion provided, for example, on a bracket or the like (not shown) by press fitting. The inner surface 20a f the lower portion of the second fitting member 20 forms a housing space for housing the antivibration unit 40.

The antivibration unit 40 is disposed so as to cover the recessed portion 31 of the insulator 30. As shown in FIG. 2, the antivibration unit 40 is provided with the partitioning member 41 and the diaphragm 3 disposed under the partitioning member 41. The diaphragm 3 is provided with a main body portion 3a whose thickness is thin and a seal portion 3b integrally formed with the outer circumferential portion of the main body portion 3a. The seal portion 3b is attached to the outer circumferential end portion on the lower surface of the partitioning member 41 and is arranged between an outer cylindrical metal member 21 and the partitioning member 41.

As shown in FIG. 3A, corresponding to the outer shape (see FIG. 1) of the liquid-charged antivibration device, the partitioning member 41 has a circular shape in a plan view. As shown in FIGS. 3A, 3B, 3C and 4, the partitioning member 41 is provided with an upper plate 42 as a first plate, a lower holder 43 as a second plate, and an elastic partitioning member 44. As shown in FIG. 4, the orifice passage 43c is provided at a part outside the elastic partitioning member 44.

Figure 5A:
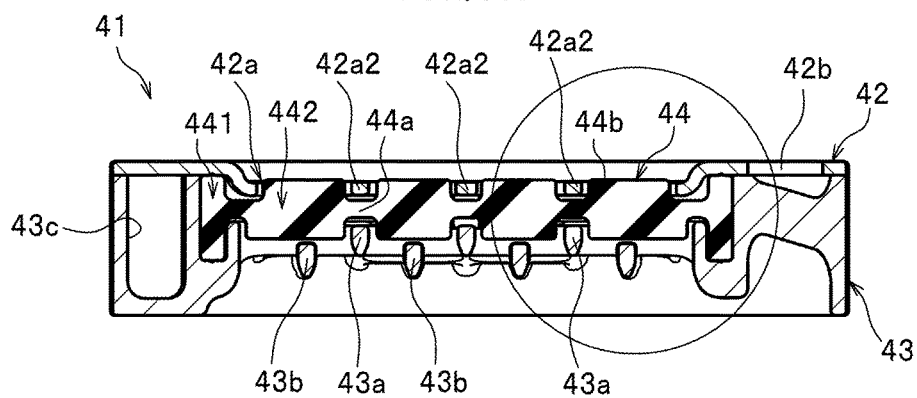
FIG. 5A is a cross-sectional view of the partitioning member shown in FIG. 3A taken along the line B-B.
Figure 5B:
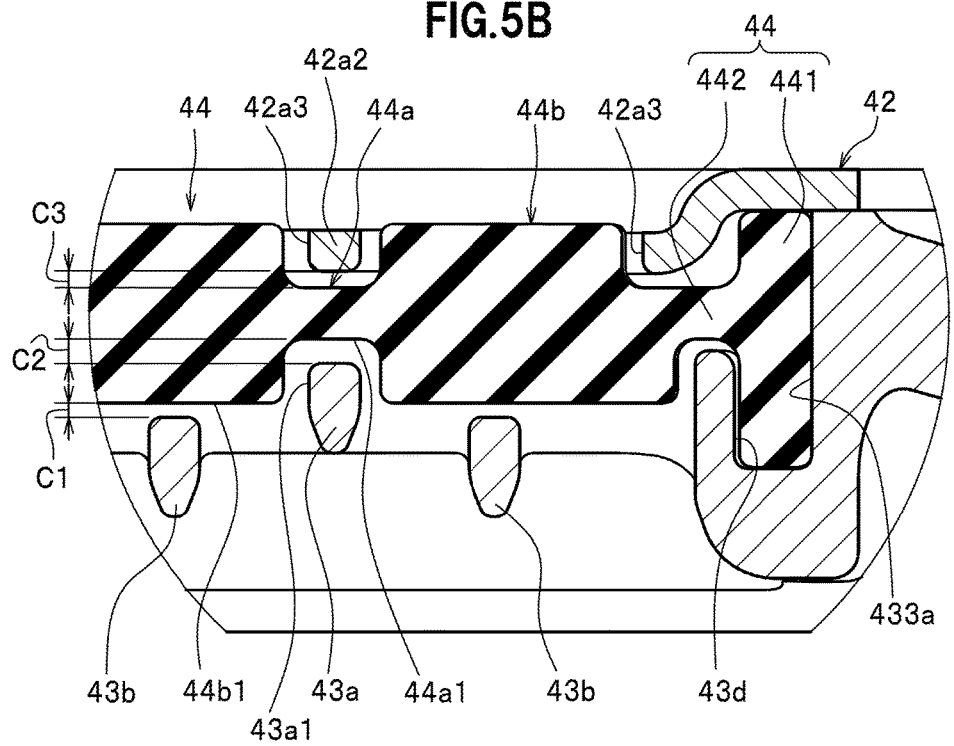
FIG. 5B is a partial enlarged cross-sectional view of the partitioning member shown in FIG. 3A.

The upper plate 42 and the lower holder 43 are made of a light metal such as an aluminum alloy. In addition, the upper plate 42 and the lower holder 43 may be made of a resin material such as a hard resin. As shown in FIGS. 3A and 4, the upper plate 42 is provided with a circular opening portion 42a. The opening portion 42a is provided with one vertical rib 42a1 and three horizontal ribs 42a2 perpendicular to the vertical rib 42a1. The opening portion 42a is partitioned into a plurality of holes 42a3 by the vertical rib 42a1 and the horizontal ribs 42a2. As shown in FIG. 3A, the upper surface of the elastic partitioning member 44 faces the respective holes 42a3. Thus, the upper surface of the elastic partitioning member 44 communicates with the main liquid chamber 1 (see FIG. 2) through the respective holes 42a3. As shown in FIGS. 5A and 5B, thick membrane portions 44b protruding from the elastic partitioning member 44 are housed in the respective holes 42a3. In this embodiment, the distance between the horizontal ribs 42a2 are arranged such that two neighboring thick membrane portions 44b are housed in the holes 42a respectively.

The vertical rib 42a1 and the horizontal ribs 42a2 are disposed so as to face the thin membrane portion 44a of the elastic partitioning member 44 with a certain clearance C3 (only clearance C3 from the horizontal ribs 42a2 is shown in FIG. 5B). The vertical rib 42a1 and the horizontal ribs 42a2 function as a displacement amount restricting portion which restricts the displacement amount of the elastic partitioning member 44 moving upward.

As shown in FIG. 3A, the outer circumferential portion of the upper plate 42 is provided with a main liquid chamber side opening portion 42b of the orifice passage 43c.

Figure 3C:
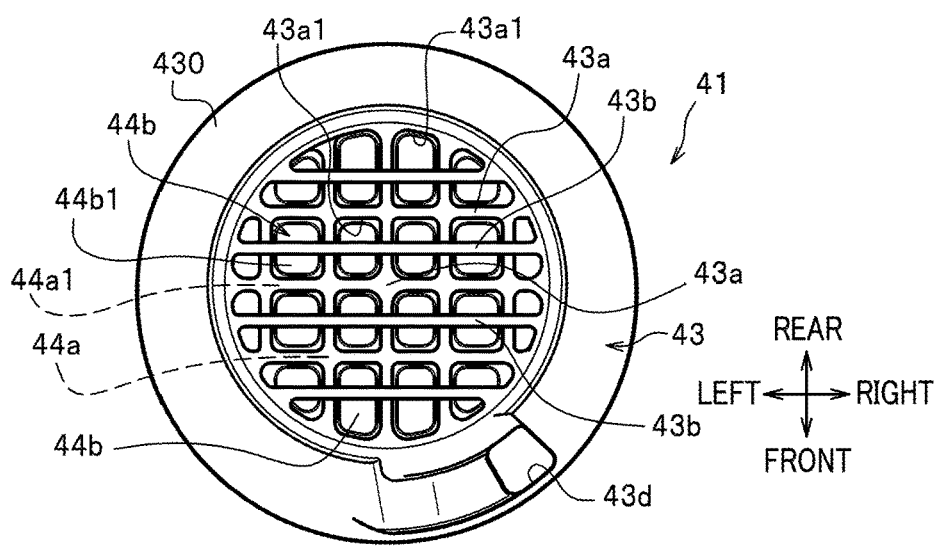
FIG. 3C is a bottom view of the partitioning member.

As shown in FIG. 4, the lower holder 43 has a bottomed cylindrical shape. The lower holder 43 is provided with a bottom portion 430 and an outer circumferential wall portion 431 standing integrally from the bottom portion 430. The inside of the outer circumferential wall portion 431 is provided with an inner circumferential wall portion 432 concentric with the outer circumferential wall portion 431. In the lower holder 43, the orifice passage 43c is surrounded by the outer circumferential wall portion 431, the inner circumferential wall portion 432, and the bottom portion 430. The orifice passage 43c is formed outside the elastic partitioning member 44 by attaching the upper plate 42 to the lower holder 43. As shown in FIG. 3C, the bottom portion 430 is provided with a sub liquid chamber side opening portion 43e of the orifice passage 43c.

The inside of the inner circumferential wall portion 432 is provided with a housing space 433 which houses the elastic partitioning member 44. The bottom portion of the housing space 433 is provided with a rib 43a formed in a grid pattern and lower ribs 43b formed so as to be superimposed under the rib 43a. The bottom portion of the housing space 433 is partitioned into a plurality of holes 43a1 by the lattice rib 43a. As shown in FIG. 3C and FIG. 5A, the lower surface of the elastic partitioning member 44 faces the respective holes 43a1 Thus, the lower surface of the elastic partitioning member 44 communicates with the sub liquid chamber 2 (see FIG. 2) through the respective holes 43a1.

As shown in FIGS. 5A and 5B, the thick membrane portions 44b of the elastic partitioning member 44 are partially housed in the respective holes 43a1. In this embodiment, the pitch interval between the lattice ribs 43a is the same as that between the thick membrane portions 44b of the elastic partitioning member 44. Thus, the thick membrane portions 44b of the elastic partitioning member 44 are housed in the holes 43a1 respectively.

As shown in FIG. 5B, the lattice rib 43b is disposed so as to face the lower surfaces 44a1 of the thin membrane portion 44a of the elastic partitioning member 44 with a certain clearance C2. The lattice rib 43a functions as a displacement restricting portion which restricts the downward movement of the thin membrane portion 44a of the elastic partitioning member 44 to certain displace amount.

In addition, the lattice rib 43a is also referred to as a second restricting portion.

As shown in FIGS. 3C and 4, the lower ribs 43b are extended in the left-right direction, and are formed integrally with the lower portion of the lattice rib 43a. Further, as shown in FIG. 5B, in order to form a clearance from the elastic partitioning member 44, the height in the upper-lower direction is made different from the height of the lattice rib 43a.

As shown in FIG. 3C, the lower ribs 43b are, as shown in FIG. 3C, disposed so as to extend across the central portions of the openings of the respective holes 43a1 of the lattice rib 43a. That is, the each lower rib 43b is disposed such that at least a part thereof is perpendicular to the lattice rib 43a.

As shown in FIG. 5B, the lower ribs 43b are disposed so as to face the lower surface 44b1 of the thick membrane portions 44b of the elastic partitioning member 44, with a certain clearance C1 from the lower surface 44b1. The lower ribs 43b function as a displacement restricting portion which restricts the downward movement of the thick membrane portions 44b of the elastic partitioning member 44 to a certain displace amount.

In addition, the lower ribs 43b are also referred to as a first restricting portion.

In this embodiment, the relation between the above clearances C1 and C2 is made as follows. That is, as shown in FIG. 5B, the clearance C1 between the thick membrane portions 44b of the elastic partitioning member 44 and the lower ribs 43b is made to be smaller than the clearance C2 between the thin membrane portion 44a and the lattice rib 43a (i.e., C1<C2).

Accordingly, if the input amplitude is relatively large, first, the thick membrane portions 44b come into contact with the lower ribs 43b so that the displacement amount of the thick membrane portions 44b is restricted, and thereafter, the thin membrane portion 44a comes into contact with the lattice rib 43a so that the displacement amount of the thin membrane portion 44a is restricted.

Figure 6:
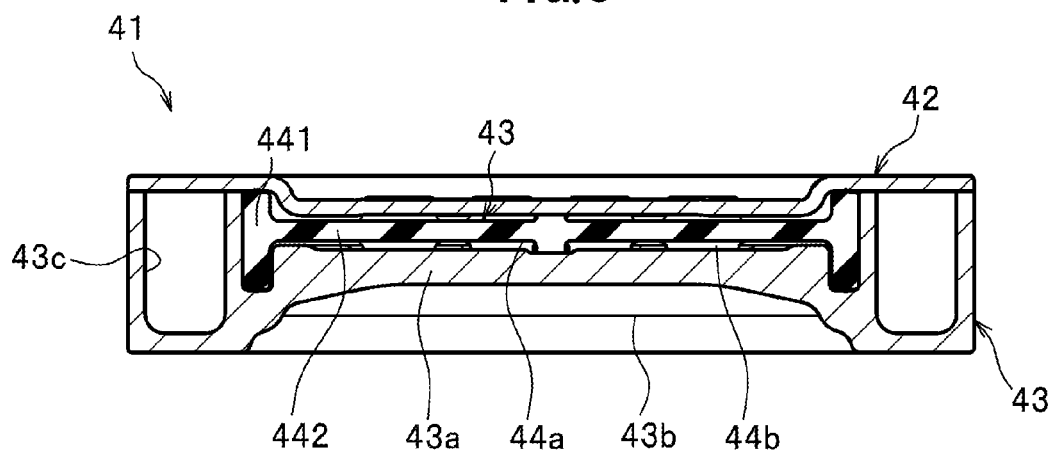
FIG. 6 is a cross-sectional view taken along the line C-C in FIG. 3A.

The elastic partitioning member 44 is made of an elastic material such as rubber and has a circular shape in a plan view. As shown in FIGS. 4, 5A, and 6, the elastic partitioning member 44 is provided with a plate portion 442, and a circumferential rib 441 extending in the upper-lower direction along the circumferential marginal portion of the plate portion 442. The plate portion 442 functions as a pressure receiving portion (pressure receiving surface) which receives the liquid pressure in the main liquid chamber 1. The plate portion 442 is elastically deformed upon reception of a change in the internal pressure of the main liquid chamber 1, and thereby absorbs the change in the internal pressure. The circumferential rib 441 is attached to a circumferential groove 43d (see FIG. 4).

The plate portion 442 is provided with the thin membrane portion 44a and the thick membrane portions 44b formed thicker in the direction of the vibration input axis than the thin membrane portion 44a. The thin membrane portion 44a adsorbs the variation in liquid pressure when the input amplitude is relatively small (i.e., low dynamic spring characteristic). The upper surface of the thin membrane portion 44a is disposed so as to face the vertical rib 42a1 and the horizontal ribs 42a2 (FIGS. 5A and 5B only show the disposition of the thin membrane portion 44a facing the horizontal ribs 42a2.) The lower surface of the thin membrane portion 44a is disposed so as to face the lattice rib 43a.

The thick membrane portions 44b are formed with a large thickness, protruding in the direction of the vibration input axis from the upper and lower surfaces of the thin membrane portion 44a. As shown in FIGS. 3A and 3C, the thick membrane portions 44b have a rectangular shape (a part of the thick membrane portions 44b have a triangular shape) in a plan view. As shown in FIG. 3A, the thick membrane portions 44b on the upper surface of the plate portion 442 are housed in the holes 42a3 of the upper plate 42. The thick membrane portions 44b on the lower surface of the plate portion 442 are housed in the holes 43a1 of the lower holder 43. As shown in FIGS. 5A and 5B, the lower surfaces of the thick membrane portions 44b are disposed so as to face the lower ribs 43b at which the lattice rib 43a is not formed. At the lower surface portions of the thick membrane portions 44b, portions which are not restricted by the rib are also formed to be thick membrane portions so as to improve damping characteristics.

The operational advantage of this embodiment will be described below.

When the input amplitude (the amplitude of engine vibration) at the time of idling or the like is relatively small (i.e., when the vibration has high-frequency and small amplitude), the thin membrane portion 44a of the elastic partitioning member 44 is elastically deformed and the variation in liquid pressure is absorbed (i.e., low dynamic spring characteristic) without restriction of the displacement amount by the lower ribs 43b and the lattice rib 43a. In this case, as the thick membrane portions 44b are formed to be thick, the thick membrane portions 44b are elastically deformed little and are moved up and down integrally with the thin membrane portion 44a. For this reason, the thick membrane portions 44b do not function as a spring, and the spring of the thin membrane portion 44a mainly functions to achieve antivibration effect.

On the other hand, when the input amplitude is relatively large (i.e., when the vibration has a low frequency and a large amplitude), both of the thick membrane portions 44b and the thin membrane portion 44a of the elastic partitioning member 44 are elastically deformed largely. In this case, according to the relation between the above clearances C1 and C2, the thick membrane portions 44b come into contact with the lower ribs 43b so that the deformation amount of the thick membrane portions 44b is restricted, and subsequently, the thin membrane portion 44a comes into contact with the lattice rib 43a so that the deformation amount of the thin membrane portion 44a is restricted. By these restrictions, deformation, of the elastic partitioning member 44 which is larger than a certain amount is restricted so that the stiffness of the elastic partitioning member 44 is effectively improved. In this way, high damping characteristic by the orifice passage 43c is achieved, and an excellent antivibration effect is realized.

Figure 7:
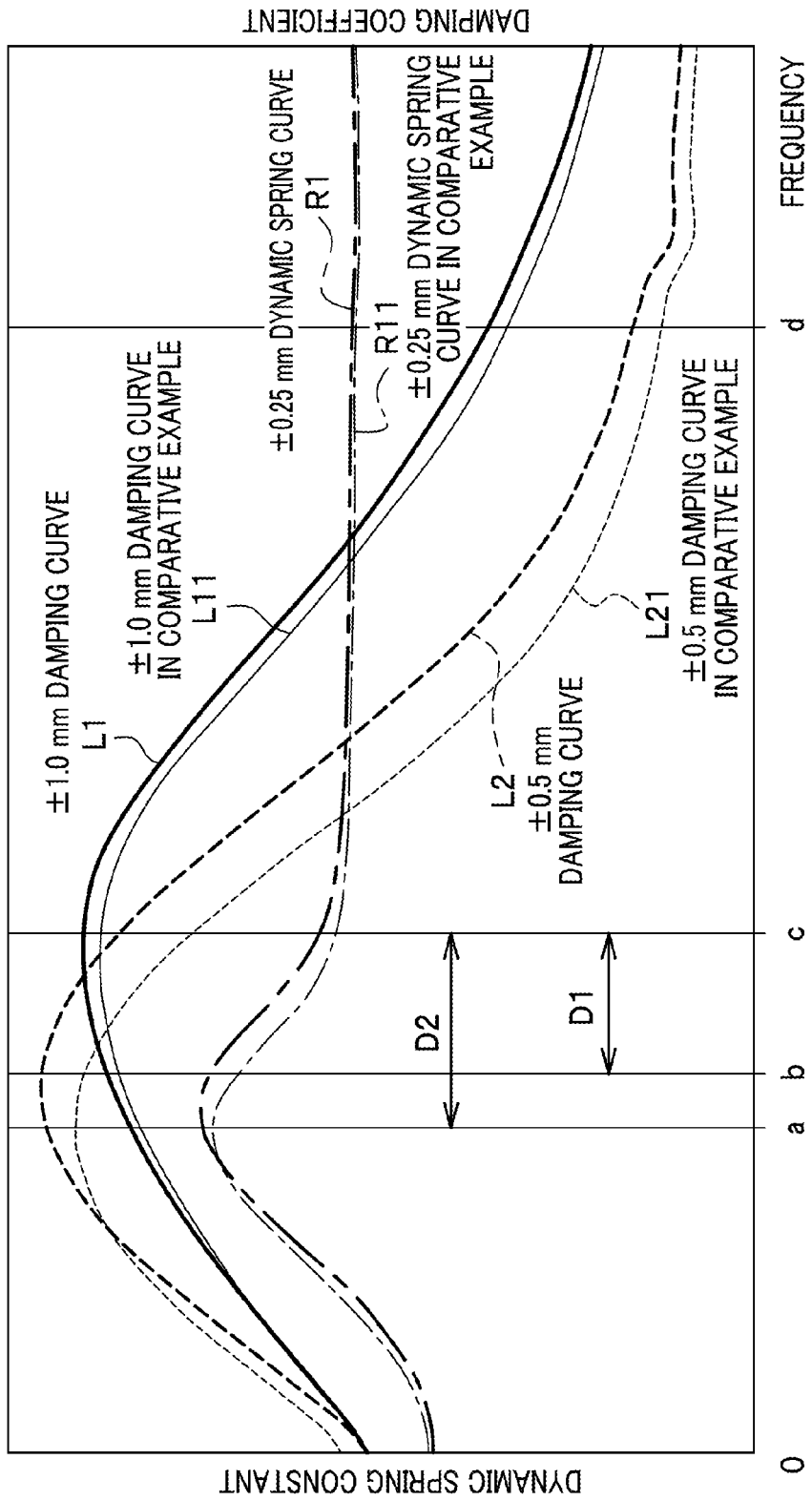
FIG. 7 is graphs showing the tendency of the dynamic characteristics of the liquid-charged antivibration device of the one embodiment.

FIG. 7 is graphs showing the tendency of the dynamic characteristics of the liquid-charged antivibration device of this embodiment. In FIG. 7, the horizontal axis represents the frequency (Hz) of input vibration; the vertical axis on the left side represents dynamic spring constant (N/mm); and the vertical axis on the right side represents damping coefficient (N·S/mm). In addition, an elastic partitioning member of a comparative example is not provided with portions corresponding to the thick membrane portions 44b of this embodiment, and is a member having substantially plate shape provided with only a thin membrane portion 44a (a common elastic partitioning member).

In FIG. 7, a damping curve L1 represented by a thick solid curve is a damping curve in a case where vibration of ±1.0 mm (a case where input amplitude is relatively large) is input in this embodiment, while a damping curve L11 represented by a thin solid curve is a damping curve in a case where vibration of ±1.0 mm is input to an elastic partitioning member in the comparative example.

Further, a damping curve L2 represented by a thick dashed curve is a damping curve in a case where vibration of ±0.5 mm is input in this embodiment, while a damping curve L21 represented by a thin dashed curve is a damping curve in a case where vibration of ±0.5 mm is input to the elastic partitioning member in the comparative example.

Still further, a dynamic spring curve R1 represented by a thick alternate long and short dash curve is a dynamic spring curve in a case where vibration of ±0.25 mm is input in this embodiment, while a dynamic spring curve R11 represented by a thin alternate long and short dash curve is a dynamic spring curve in a case where vibration of ±0.25 mm is input to the elastic partitioning member in the comparative example.

Frequency "a" is smaller than frequency "b" (i.e., a<b), and the frequency "b" is smaller than frequency "c" (i.e., b<c). That is, frequencies "a"-"c" have a relation of a<b<c.

In both of the damping curve L1 of this embodiment and the damping curve L11 of the comparative example, damping peaks occur at frequency c.

On the other hand, a damping peak occurs at frequency "b" on the damping curve L2 in this embodiment, while a damping peak occurs at frequency "a" on the damping curve L21 in the comparative example. That is, the width D1 of the damping peak (frequency "c"-frequency "b") in this embodiment can be made narrower (smaller) than the width D2 (frequency "c"-frequency "a") of the damping peak in the comparative example. In other words, in this embodiment, it is possible to make two damping peaks closer to each other than those in the comparative example, and to effectively reduce movement of the peak of damping effect to the low frequency side due to the amplitude dependency (i.e., amplitude dependency is lower than that of the comparative example). Since it is possible to make two damping peaks close to each other as described above, the two damping peaks can be controlled together by one control device (elastic partitioning member 44), and two different vibrations (vibration of ±0.5 mm and vibration of ±1.0 mm) can be damped.

In addition, in this embodiment, for the input of vibration of ±0.25 mm, a low dynamic spring for a vibration in a high frequency range (an idle vibration, a vibration near frequency "d" in the figure) can be maintained like the elastic partitioning member of the comparative example. That is, in this embodiment, although the elastic partitioning member 44 has a structure including the thin membrane portion 44a and the thick membrane portions 44b, the thin membrane portion 44a maintains low dynamic spring performance equal to that of a common elastic partitioning member.

In this embodiment, while achieving reduction of amplitude dependency, low dynamic spring characteristic can be achieved, and the dynamic characteristics can be thereby improved.

According to the liquid-charged antivibration device in this embodiment described above, if the input amplitude is relatively small, the variation in liquid pressure can be absorbed by the thin membrane portion 44a of the elastic partitioning member 44 (i.e., low dynamic spring characteristic can be achieved). On the other hand, if the input amplitude is relatively large, the displacement amount of the thick membrane portions 44b of the elastic partitioning member 44 is restricted by the lower ribs 43b and the displacement amount of the thin membrane portion 44a is restricted by the lattice rib 43a so that the stiffness of the elastic partitioning member can be effectively improved.

Thus, change in the frequency characteristic associated with change in the amplitude is reduced, and reduction of the amplitude dependency can be achieved.

Further, as the clearance C1 between the thick membrane portions 44b is smaller than the clearance C2 between the thin membrane portion 44a, the displacement amount of the thick membrane portions 44b is restricted if input amplitude is relatively large, and the displacement amount of the thin membrane portion 44a is subsequently restricted. Consequently, the pressure in the main liquid chamber 1 quickly rises to attain high damping characteristic, and the change in the frequency characteristic associated with the change in the amplitude can be suitably reduced.

Still further, as the elastic deformation of the elastic partitioning member 44 is gradually restricted by the difference between the clearances C1 and C2, generation of strike sound (contact sound) can be reduced, compared with a case where the elastic deformation of the elastic partitioning member 44 is restricted at a time.

Still further, as the lower ribs 43b and the lattice rib 43a are disposed perpendicular to each other, the displacement amount of the elastic partitioning member 44 can be made uniform, and the amplitude dependency can be reduced more effectively.

Although an embodiment of the present invention has been described above, the invention is not limited to the foregoing embodiment, and various modifications and changes can be made.

For example, the elastic partitioning member 44 is not limited to one having the circular shape in a plan view, and various shapes such as an elliptical shape, a quadrangular shape, and the like can be applied.

Figure 8:
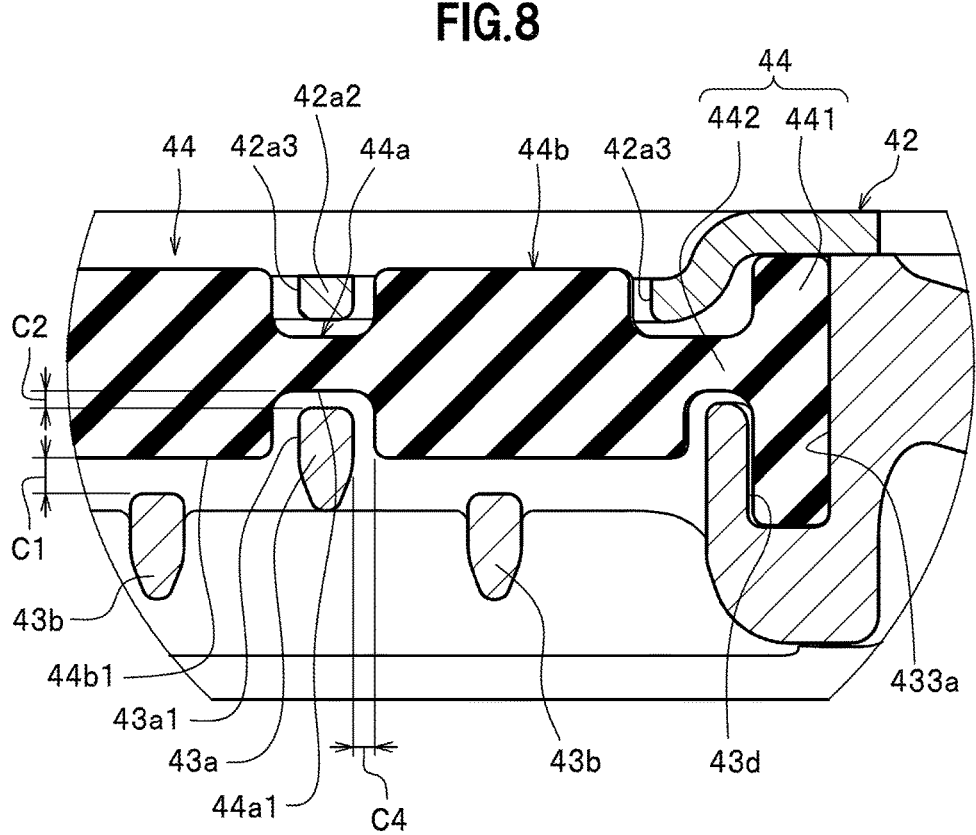
FIG. 8 is a partial enlarged cross-sectional view of a partitioning member of a modified example.

Further, as shown in FIG. 8, the relation between the clearance C1 between the thick membrane portions 44b and the clearance C2 between the thin membrane portions 44a can be made as C1>C2. In this case, the clearance C1 between the thick membrane portions 44b can be made as C2+C4. Herein, C4 represents the clearance between the lattice rib 43a and the side surfaces of the thick membrane portions 44b. As described above, the clearance between the thick membrane portions 44b is made to be C1. For this reason, if the input amplitude is relatively large, the thick membrane portions 44b come into contact with the lower ribs 43b, and the displacement amount of the thick membrane portions 44b is thereby restricted by using the elastic deformation of the thin membrane portion 44a. In this case, the stiffness of the elastic partitioning member 44 is effectively improved. Thus, change in the frequency characteristic associated with change in the amplitude is suppressed, and the amplitude dependency can thereby be reduced.

Still further, although the rib 43a restricting the displacement amount of the thin membrane portion 44a is made in a lattice configuration in the above embodiment, the configuration is not limited thereto. Linear ribs formed parallel to the lower ribs 43b, or linear ribs formed perpendicular to the lower ribs 43b may also be used.

Still further, although the lower ribs 43b are disposed so as to extend in the left-right direction and across the central portions of the openings of the respective holes 43a1 of the lattice rib 43a, the configuration is not limited thereto. The lower ribs 43b may be disposed at any positions as long as the displacement amount of the thick membrane portions 44b can be restricted.

What is claimed is:

1. A liquid-charged antivibration device, comprising:
a liquid chamber in which operating liquid is charged; and
a partitioning member which partitions the liquid chamber into a main liquid chamber and a sub liquid chamber,
wherein the partitioning member includes: a first plate disposed on the main liquid chamber side; a second plate disposed on the sub liquid chamber side; and an elastic partitioning member sandwiched between the first plate and the second plate,
wherein the elastic partitioning member includes: a thin membrane portion; and a thick membrane portion whose thickness in a direction of a vibration input axis is thicker than that of the thin membrane portion,
wherein the second plate includes a restricting portion which restricts elastic deformation of the elastic partitioning member, and
wherein the restricting portion includes:
a first restricting portion which is disposed so as to face the thick membrane portion and restricts elastic deformation amount of the thick membrane portion; and
a second restricting portion which is disposed so as to face the thin membrane portion and restricts elastic deformation amount of the thin membrane portion;
wherein the first restricting portion and the second restricting portion are disposed so as to be perpendicular at least partially to each other.

2. The liquid-charged antivibration device according to claim 1,
wherein clearance between the thick membrane portion and the first restricting portion is smaller than clearance between the thin membrane portion and the second restricting portion.

* * * * *